Sept. 15, 1942.                C. E. LINEBARGER                2,296,169
                              HYDROMETER AND THE LIKE
                              Original Filed Jan. 9, 1937

*Inventor,*
Charles E. Linebarger, Deceased,
By Charles E. Linebarger, Jr. Administrator by Thos. A. Banning
             Atty.

Patented Sept. 15, 1942

2,296,169

UNITED STATES PATENT OFFICE 2,296,169

HYDROMETER AND THE LIKE

Charles E. Linebarger, deceased, late of Chicago, Ill., by Charles E. Linebarger, Jr., administrator, Chicago, Ill.

Original application January 9, 1937, Serial No. 119,735. Divided and this application December 26, 1939, Serial No. 311,060

3 Claims. (Cl. 265—46)

The present invention relates to improvements in hydrometers and the like intended to very accurately indicate the density of liquids in which they are immersed, independently of and with proper compensation for temperature changes of such liquids. In cases in which the temperature co-efficient of expansion of the liquid to be tested changes or varies at different temperature ranges it is also a further feature of the present invention to provide for effecting proper compensation in the readings of the present instruments so that correct indications will always be given throughout the entire intended temperature range.

In Letters Patent of the United States, No. 2,168,353, issued to Charles E. Linebarger, August 8, 1939, there is disclosed hydrometers of a type in which provision has been made for temperature correction by means of a bi-metal element comprising a portion of the pointer which moves over the face of the scale or vane carrying the mark or marks with which the pointer position is to be compared for readings, but in the arrangement of that patent the fixed end of the pointer is connected directly to the supporting stud or pin, and the bi-metal element is located in the length of the pointer where its effectiveness is thereby impaired. As one feature of the present invention there is provided a bi-metal element for the pointer, and located at the supported end of the pointer where such bimetal element is most effective for correction purposes, so that such bi-metal element comprises in effect a portion of the support for the pointer, and thereby the correction effect of such bi-metal element is increased to a maximum amount.

In the disclosures of said earlier Patent No. 2,168,353, there is also made use of buoyant members connected to or comprising a portion of the pointer element, or comprising a portion of or connected to the vane element; and a further feature of the present invention concerns itself with the use of a bi-metal element in such devices, but as a portion of the pivotal end or mounting of the pointer, as distinguished from comprising a portion of the pointer proper.

As respects the foregoing features the present application is a division of the co-pending application for improvements in Hydrometers, which became Letters Patent of the United States No. 2,185,205, issued January 2, 1940.

As a further feature of the present invention there is sometimes combined the hydrometer proper with a suitable syringe arrangement such that the liquid to be tested may be drawn up into such syringe from a larger body of such liquid, and so that the test may then be effected on the liquid contained in such syringe in a more convenient manner; and as respects such syringe arrangement the present application is a division of the co-pending application, Serial No. 249,742, filed January 7, 1939.

The other objects and uses of the present invention will appear from a detailed description of the same, which consists in the features of construction, and combinations of parts hereinafter described and claimed.

Figure 1:
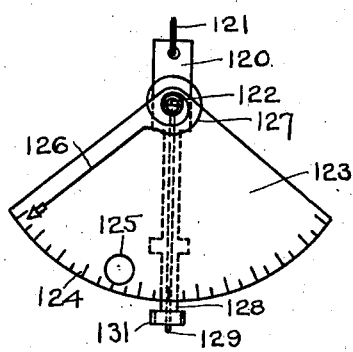
Figure 1 shows a face view of a hydrometer embodying the features of the present invention.
Figure 2:
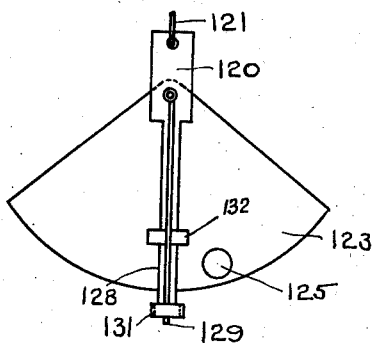
Figure 2 shows a back face view corresponding to Figure 1.
Figure 3:
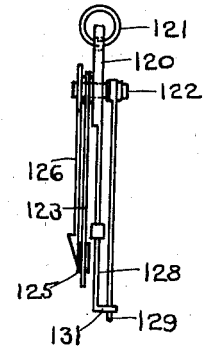
Figure 3 shows an edge view corresponding to Figures 1 and 2.

Referring first to the arrangement shown in Figures 1, 2 and 3, the hydrometer therein shown comprises a support 120 suspended by a ring 121, or other form of universal joint, so that the center of mass of the hydrometer is free to come in line vertical with the support. Fixed to the support 120 is a pin or pivot 122, and pivoted to this pin is a dial vane 123 on which is formed a suitable scale 124. Fixed to this vane is a buoyant member 125. When the vane is immersed in the liquid to be tested the member 125 will be buoyed upwardly, rotating the vane on its pivot. A pointer 126 is fixed to the pin 122, or to the support elsewhere, and when the vane comes to rest the pointer will indicate the density of the liquid by the scale roughly.

The buoyant member is located near the lower portion of the vane, but to one side of the vertical line of the axis thereof. As the buoyant member rises under the buoyant force of the liquid, carrying with it the lower portion of the vane, the center of gravity of the vane will be forced upwardly, and this will finally cause the vane to come to rest when the force of gravity acting on the vane becomes equal to the buoyant force of the liquid acting on the buoyant member 125. The force of gravity effective in preventing further rotation of the vane obviously will be assisted by the force of gravity acting on the buoyant member.

In order to compensate for changes of density of the liquid being tested with changes of temperature thereof, there is provided a bi-metal means for varying the position of the pointer 126 in response to changes in the temperature of the liquid. In this instance the bi-metal means comprises a coil 127 which has its inner end fixed to the pin 122 and its outer extremity supporting the pointer 126. As the temperature of the liquid rises, the decreasing density will allow the buoyant member to sink, but at the same time the coil 127 will unwind slightly and the pointer will move downwardly, thus indicating a higher density on the scale than the actual density of the liquid at the increased temperature, and thus indicating more exactly the actual density at the normal temperature.

In order to ensure a vertical position of the vane there may be suspended from the support what may be called a marking member 128. This member is fixed to the support so as to be substantially parallel with the broad surface of the vane. Also supported by the support, but pivoted thereto, is a plumb line 129. This line is adapted to indicate when the vane is vertical, as it should then be parallel with the adjacent marking member 128. In order to prevent wobbling of the plumb line, in manipulating the hydrometer, there may be provided a horizontal ring 131, fixed to the marking or reference member 128, with the plumb line passing through the ring. To assure the rapid assumption of the vertical position of the hydrometer a weight 132 may be attached to the marking member (see Figure 2), so as to lower its center of gravity.

In operation the hydrometer is suspended, by a wire or other suitable means connected to the ring 121, in the liquid to be tested. When the hydrometer hangs vertically, the buoyant member 125 will be able to force the vane towards the left, and, if the temperature is normal, the correct density will be indicated by the pointer; but if the temperature is above the normal temperature, or below, the vane will move to a position below or above normal, and the pointer will be shifted down or up, as the case may be, and will thus compensate its readings for the variation in temperature.

Figure 4:
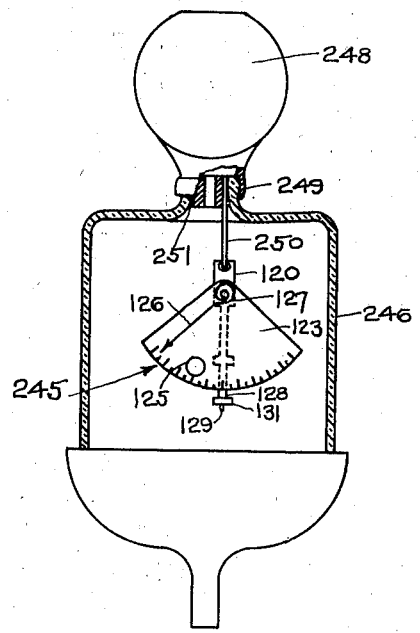
Figure 4 shows a syringe arrangement wherein a device of the form of Figures 1, 2 and 3 is embodied.

In Figure 4 there is shown a hydrometer 245 enclosed in the barrel 246 of a syringe. In this case the hydrometer illustrated is similar to that of Figures 1, 2 and 3, and the operation is the same except that the liquid to be tested, or a portion thereof, is drawn into the barrel through the nozzle by the operation of the rubber bulb 248. Other similar hydrometers could be used for the purpose by properly suspending them from the neck of the barrel. In the present case the hydrometer is held by a link 250 the upper end of which is held firmly in the neck by a cork 251, the link 250 corresponding to the support 121 of the hydrometer of Figures 1, 2 and 3.

It is to be noted that in the forms of hydrometer herein illustrated and described there is, in each case, shown an arrangement wherein the needle or pointer is connected at its pivotal end to a coiled or spiralled bi-metal element, in combination with the feature that the movable member, whether pointer or vane, is provided with the buoyant member, or is of itself of buoyant nature, thereby distinguishing from the earlier Patent No. 2,168,353, wherein the pointer itself is composed, at least in part, of the bi-metal element; it being evident that the present arrangements possess certain advantages over the earlier arrangement, both in matters of construction, as well as in accuracy of operation and indication.

While there are shown and described herein only certain embodiments of the features of the present invention, still the invention is not limited thereto, except as so limited in the claims to follow.

What is claimed is:

1. A hydrometer comprising a support, a vane element comprising a scale sheet rotatably mounted on the support, a buoyant member mounted on the sheet, a scale pointer mounted on the support, and means responsive to variations in temperature of the liquid being tested for moving the pointer relative to the scale, substantially as described.

2. A hydrometer as claimed in claim 1 including means for ensuring a vertical position for the support, substantially as described.

3. In a hydrometer intended for immersion in a body of liquid to be tested, the combination of a support, a plate segment pivotally connected to one end portion of said support, said segment being provided with a buoyant element to cause it to pivot when immersed in a liquid to be tested, a pointer co-operating with said segment, and a bi-metallic element affixing said pointer to said support for compensating for temperature variations in the liquid under test, substantially as described.

CHARLES E. LINEBARGER, Jr.,
*Administrator of the Estate of Charles E. Linebarger, deceased.*